United States Patent [19]

Marchadour

[11] Patent Number: 5,265,713
[45] Date of Patent: Nov. 30, 1993

[54] ENDLESS BELT PRODUCT FEEDING SYSTEM

[76] Inventor: Jean C. Marchadour, 2460 E. Granite Pl., Sandy, Utah 84092

[21] Appl. No.: 930,015

[22] Filed: Aug. 13, 1992

[51] Int. Cl.$^5$ .............................................. B65G 47/18
[52] U.S. Cl. ...................... 198/524; 198/535; 198/626.4
[58] Field of Search ............... 198/524, 535, 546, 547, 198/560, 563, 566, 626.1, 626.2, 626.3, 626.4, 572, 573

[56] References Cited

U.S. PATENT DOCUMENTS

| | | | |
|---|---|---|---|
| 895,318 | 8/1908 | Warren | 198/626.2 |
| 1,805,177 | 5/1931 | Hodnett | 198/626.4 X |
| 2,849,102 | 8/1958 | Borrowdale | 198/626.2 X |
| 3,063,362 | 11/1962 | Guettler | 198/626.2 X |
| 3,910,405 | 10/1975 | Couperus et al. | 198/626.4 |
| 4,200,181 | 4/1980 | Clarke | 198/572 |
| 4,352,604 | 10/1982 | Carascon et al. | 198/573 X |
| 4,562,918 | 1/1986 | Tschernatsch et al. | 198/626.2 X |

*Primary Examiner*—D. Glenn Dayoan
*Attorney, Agent, or Firm*—Thorpe, North & Western

[57] ABSTRACT

A particulate product conveying apparatus includes a first endless belt, a portion of which moves in a generally horizontal direction, and second and third endless belts disposed at horizontally spaced-apart locations on either side of the first belt where it moves horizontally, in a generally facing relationship to extend in parallel with the first belt. The positioning of the first, second and third belt forms a moving trough or channel, having a moving bottom wall and moving side walls, to receive particulate product in the trough or channel and to carry it towards a destination. A motor or motors drive the first, second and third belts in the same direction and at substantially the same speed towards the destination to thereby efficiently deliver particulate product from a source to a destination.

28 Claims, 2 Drawing Sheets

ENDLESS BELT PRODUCT FEEDING SYSTEM

BACKGROUND OF THE INVENTION

This invention relates to apparatus and method for receiving particulate material, miscible material, and the like and conveying it, using endless belts, to a deposit site. In particular, the invention relates to a system for forming endless belts into a material carrying, moving enclosure with quantity delivery control capabilities.

Apparatus and processes for automatic filling containers such as cans or jars with both food and non-food products are well-known in the art, having become quite sophisticated for particular types and consistencies of products. An example of such sophisticated apparatus for precisely metering the amount of flowable material deposited in containers is disclosed in U.S. Pat. No. 4,501,622.

Apparatus and methods disclosed and used in the prior art have generally been acceptable when used in filling containers with flowable material, such as liquid or pasty products, but apparatus and methods for filling containers with more solid or particulate products have generally had significant drawbacks. Part of the problem is in moving the solid or particulate product from a receiving location to a discharge or dosing location without clogging the passageway, losing the product, or experiencing wide variations in the volume and speed of product delivered. For example, delivery of grains, small or chopped vegetables and fruits, and soft noodles and spaghetti-like products can be difficult to deliver to a container filling station because such product, among other things, tends to bunch together and in some cases cling to the conveying apparatus. This is especially true if the particulate product is of non-uniform size.

SUMMARY OF THE INVENTION

It is an object of the invention to provide a new and improved system for conveying particulate material from a receiving location to a discharge or dosing location.

It is another object of the invention to provide such a system in which the particulate product can be more precisely and efficiently metered and carried to a discharge site.

It is a further object of the invention to provide such a system in which the product is held securely in the delivery line from the point of receipt of the product to the point of discharge.

It is also an object of the invention to provide such a system for conveying material gently and without serious damage occurring to the material.

It is still another object of the invention to provide such a system which is simple in construction and easy to maintain.

The above and other objects are realized in a specific illustrative embodiment of product feeding apparatus for receiving particulate product from a product source and feeding it to a deposit site. The apparatus includes a first endless belt disposed with a first section moveable in a generally horizontal direction, and a second section moveable in a generally downward direction, where a portion of the first section is positioned under the product source to receive product onto the first section portion for movement to the second section. The apparatus also includes second and third endless belts disposed with first sections horizontally spaced-apart above and on either side of the first section of the first belt to move in the same direction and at the same speed as the first section of the first belt, to thereby move product to the second section of the first belt. Finally, the apparatus includes a fourth endless belt disposed with a first section above a part of the first section of the first belt in front of the product source and moveable in the same direction and at the same speed as the first section of the first belt and the first sections of the second and third belts, to thereby contact product received onto the first section portion of the first belt and move it to the second section of the first belt. The fourth endless belt is also disposed with a second section generally adjacent to, but spaced apart from, the second section of the first belt, and is moveable in the same direction and at the same speed as the second section of the first belt to thus carry product received between the second sections of the first belt and second belt, generally downwardly to the deposit site. The first, second, third and fourth endless belts cooperate to "grip" and hold the product between the belts until it is delivered to the deposit site.

In accordance with one aspect of the invention, the product feeding apparatus also includes detection devices for detecting the amount of product received onto the first section portion of the first belt, and causing an increase in the speed of movement of the belts when less product is received and causing a decrease in the speed of movement of the belts when more product is received. In this manner, a substantially uniform rate of delivery of product may be maintained.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
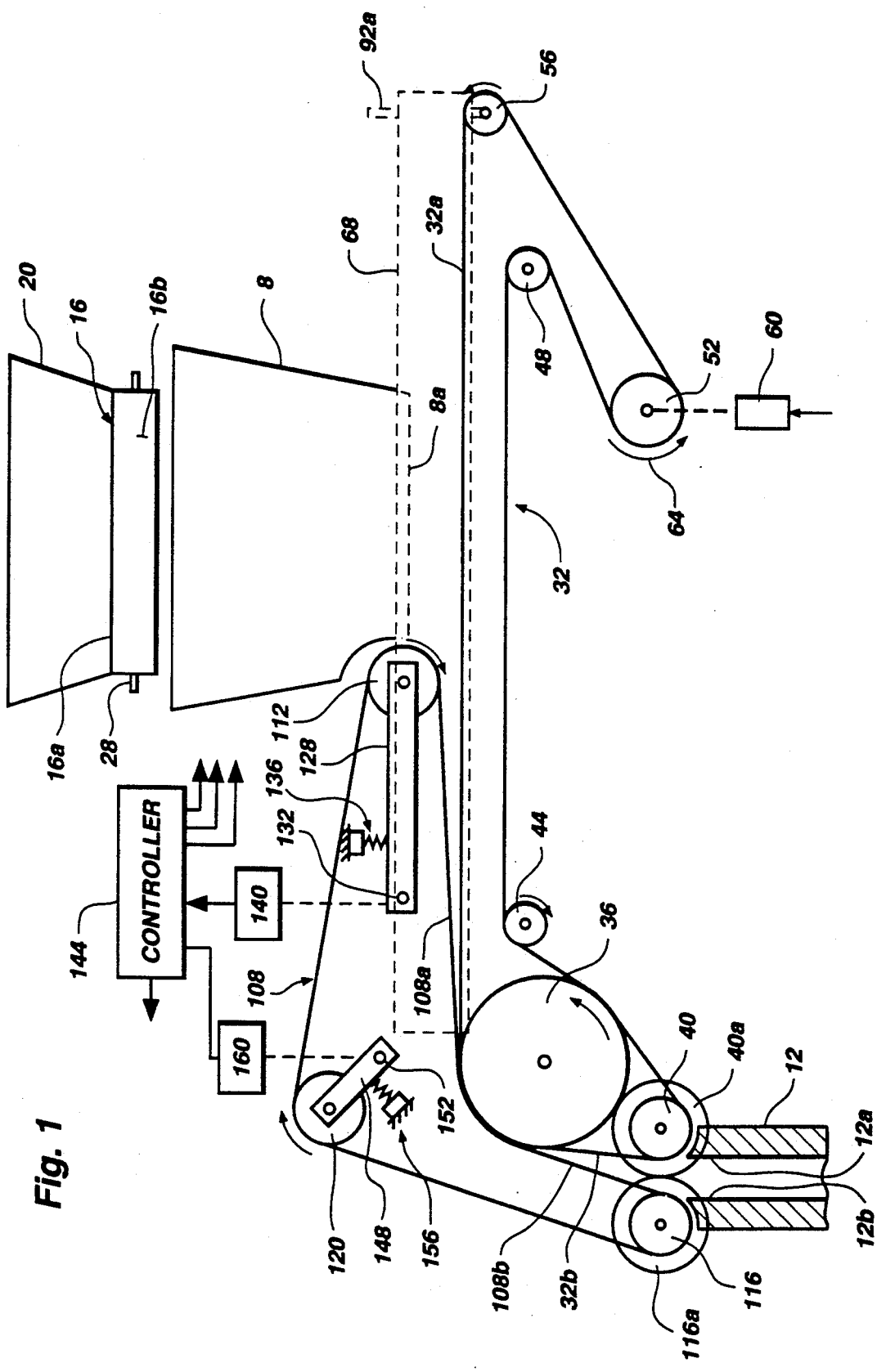
FIG. 1 is a graphic, side, elevational view of an endless belt product feeding system made in accordance with the principles of the present invention.
Figure 2:
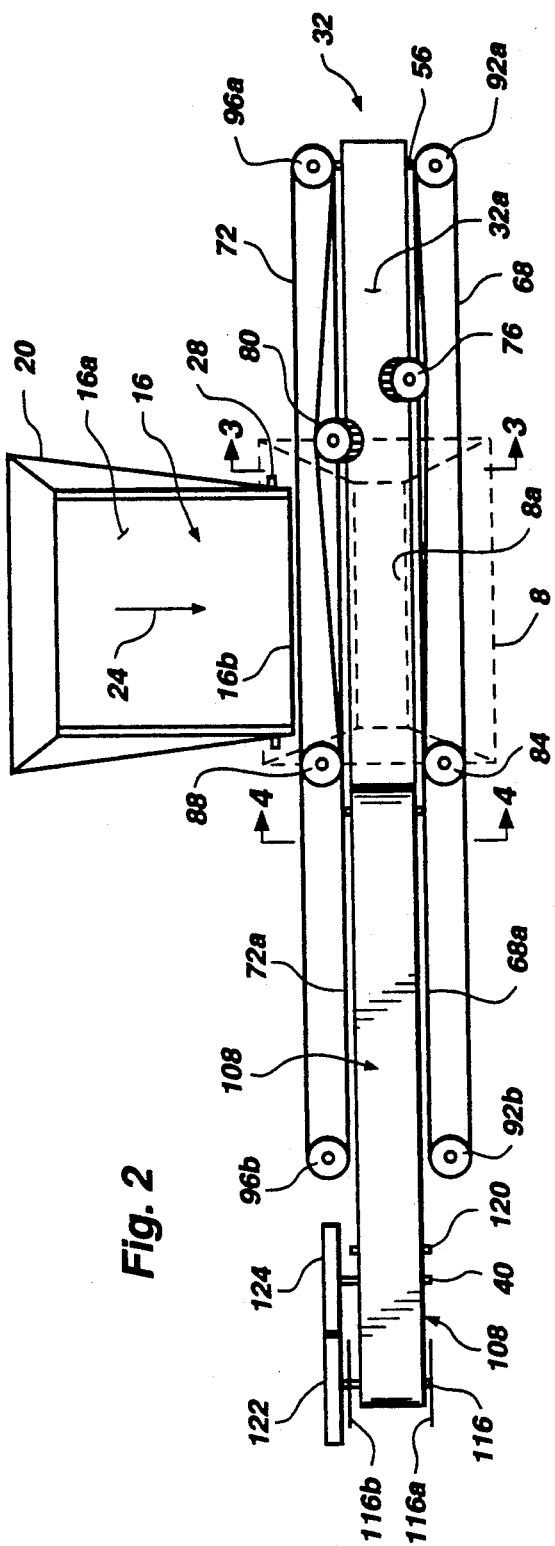
FIG. 2 is a graphic, top, plan view of the system of FIG. 1.

Referring to the drawings, especially FIGS. 1 and 2, there is shown an endless belt product feeding system for carrying particulate product from a hopper 8 to a deposit site in the form of a tube 12. Product is delivered to the hopper 8 by a horizontal feed belt 16 whose upper section 16a receives particulate product through a bin or chute 20 and moves it in the direction indicated by the arrow 24 (FIG. 2) to the hopper 8. The material is simply moved to the edge or location 16b where the endless belt 16 wraps about a belt pulley 28 (FIG. 1), and then drops into the hopper 8. This is all conventional apparatus.

Disposed under the hopper 8 to receive particulate material supplied therethrough is an endless belt 32 having a generally horizontal section 32a and a generally vertical section 32b (FIG. 1). The belt 32 extends from the horizontal section 32a about a belt pulley 36 to the vertical section 32b, and from there about another belt pulley 40 to again contact the pulley 36. From there the belt extends about belt pulley 44 along another horizontal section to a belt pulley 48, and from there downwardly and rearwardly to and about another belt pulley 52 and then back to a belt pulley 56 to begin the horizontal section 32a. A variable speed motor 60 is coupled to pulley 52 to cause the pulley to rotate in the direction indicated by the arrow 64 (FIG. 1) to thereby cause the belt 32 to move at selectable speeds. Control of the speed of movement of the belt 32 will be discussed more hereafter.

Figure 4:
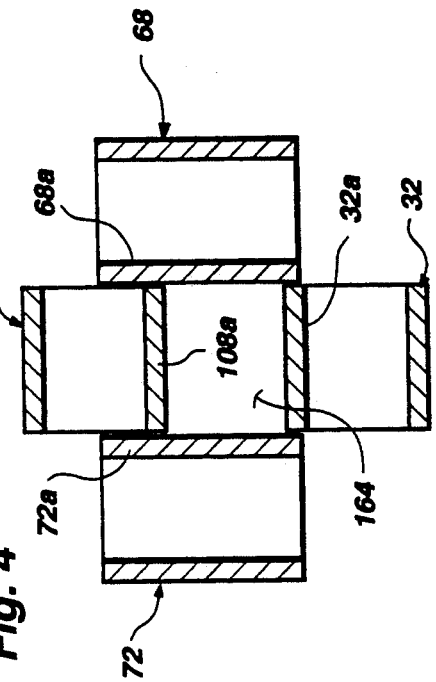
FIG. 4 is a graphic, cross-sectional view of the system of FIG. 2 taken along lines 4—4.
Figure 3:
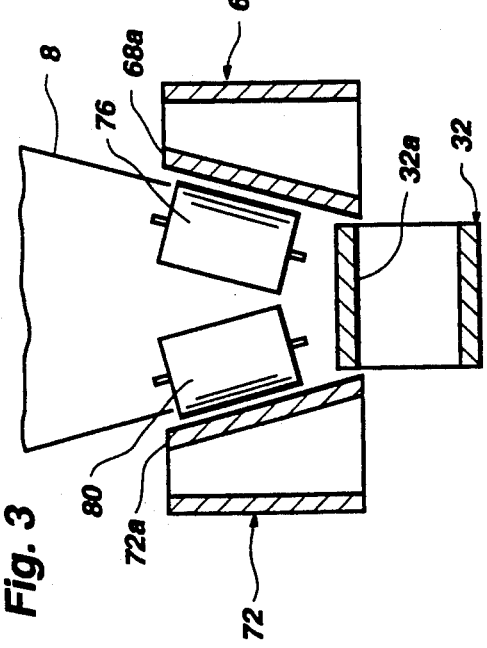
FIG. 3 is a graphic, fragmented, cross-sectional view of the system of FIG. 2 taken along lines 3—3.

Disposed to extend upwardly from either side of the horizontal section 32a of the endless belt 32 are a pair of endless belts 68 and 72, formed to define a trough-shaped particulate material receptacle, as best seen in FIGS. 3 and 4. Two facing sections 68a and 72a of the belts 68 and 72 respectively, project upwardly from adjacent respective sides of the horizontal section 32a of the belt 32 to confine and hold product deposited from the hopper 8 onto the belt 32.

To facilitate receiving the product into the trough or channel formed by the belts 32, 68 and 72, the top edges of sections 68a and 72a of the belt 68 and 72 respectively are forced outwardly to spread apart from one another by spreading pulleys 76 and 80 which are rotatably mounted between sections 68a and 72a, as best seen in FIGS. 2 and 3. The spreading pulleys 76 and 80 are staggered, as shown in FIG. 2, just behind the location at which material is deposited from the hopper 8 onto the belt 32, to contact and spread apart sections 68a and 72a of belt 68 and 72. The top edges of sections 68a and 72a continue in a spread-apart condition, but decreasingly so, from the locations of the pulley 76 and 80 to the locations of guide pulleys 84 and 88, where the top edges of section 68a and 72a are urged back to a generally vertical orientation. FIG. 3 shows sections 68a and 72a spread apart at a position just in front of pulleys 76 and 80, and FIG. 4 shows sections 68a and 72a back in a vertical orientation just in front of pulleys 84 and 88.

The belts 68 and 72 are mounted to move on end pulleys 92a and 92b, and 96a and 96b, respectively, as best seen in FIG. 2. Pulleys 92a and 96a are coupled (for example by beveled gear wheels) to pulley 56 to rotate as pulley 56 is rotated to thereby drive endless belts 68 and 72—at the same speed as endless belt 32. Thus, when conveying product received onto belt 32, the belts 32, 68 and 72 are all driven at substantially the same speed and in the same direction to move the product from below the hopper 8 towards and into contact with another endless belt 108.

The endless belt 108 is disposed above a portion of belt 32 and includes a generally horizontal section 108a and a generally vertical section 108b (see FIG. 1). The belt 108 wraps about a belt pulley 112, to define an input end, and then extends forwardly to contact the belt 32 at the location of the pulley 36 and wrap about the belt 32 and pulley 36 as shown in FIG. 1. From the pulley 36, belt 108 extends downwardly, gradually spreading apart from belt section 32b, to a location where it wraps about another belt pulley 116. From pulley 116, the belt 108 extends to and about a take-up or tensioning pulley 120, and from there back to pulley 112

Belt 108 is driven by pulley 116 which, in turn, is driven by pulley 40. This is accomplished by a gear wheel 122 (FIG. 2), which is mounted to rotate with pulley 116, meshing with and driving gear wheel 124, which is mounted to rotate with pulley 40. Belt 108 is thus caused to move at substantially the same speed and in the same direction as belt 32, again as will be discussed momentarily.

Pulley 112 is mounted on one end of a pivot arm 128 which, in turn, is mounted to pivot at its other end about a pivot point 132 (FIG. 1). The pivot arm 128 is normally biased downwardly to a predetermined angular position above the belt 32 by a biasing element 136 which also monitors tension which, nevertheless, allows the pivot arm to pivot some distance upwardly from the belt 32. Such pivoting occurs when product deposited through the bin 8 onto the belt 32 is moved to encounter belt 108 which engages the product and, since the belt 108 is moving, aids in moving the product toward the tube 12. In the course of engaging the product, if the height of the product on the belt 32 is greater than the distance from the belt 32 to the belt 108 (where it is wrapped about pulley 112), the product will push against the belt 108 and pulley 112 causing the pulley-end of the pivot arm 128 to be forced upwardly to allow the product to move under the belt 108.

The amount of pivoting of the pivot arm 128 caused by product on belt 32 forcing the pivot arm upwardly is measured by a pivot angle encoder 140, which supplies the information to a controller 144 This information provides an indication as to the quantity of product deposited on the belt 32 and the controller 144 uses the information to signal the variable speed motor 60 to vary the speed of the belts 32, 68, 72 and 108 to accommodate the quantity of product being deposited on belt 32. Thus, if more product is deposited on the belt 32, causing the pivot arm 128 to pivot upwardly, then the controller 144 detects this via the encoder 140 and signals the variable speed motor 60 to slow movement of the belts so that the rate of delivery of product to the tube 12 is maintained substantially constant. On the other hand, if less product is deposited on the belt 32 resulting in the pivot arm 128 moving downwardly, then this likewise is detected by the controller 144 which signals the variable speed motor 60 to increase the speed of the belts to again maintain substantially constant the rate of delivery of product to the tube 12. The controller 144 may be set or programmed to provide a selected product delivery rate, as desired by the user.

The biasing element 136 might illustratively be a spring or similar tensioning device, the encoder 40 might illustratively be a shaft encoder which detects rotation, and the controller 144 might illustratively be a microprocessor such as a Square D 2000.

The tensioning pulley 120 is also mounted on one end of a pivot arm 148 which pivot arm is mounted to pivot at its other end about a pivot point 152. A biasing element 156 urges the pivot arm 148 upwardly to force the pulley 120 against the belt 108 to maintain a certain tension on the belt, but also allows the pivot arm 148 to pivot downwardly to accommodate a tightening of the belt 108 caused, for example, by an increased quantity of product moving into contact with section 108a of the belt causing that section to move upwardly. In this manner, the pulley 120 maintains a substantially constant tension on the belt 108.

An encoder 160 is coupled to the pivot arm 148 to provide an indication to the controller 144 of the degree of pivoting of the arm. This provides a further indication to the controller of the quantity of product present on the belt 32. Such information is useful since although a larger quantity of product on the belt may cause pivot arm 128 to pivot upwardly, after that quantity has passed the location of the pulley 112, moving towards the pulley 36, the pivot arm 128 could pivot downwardly back to its original position to indicate no significant quantity of product being present on the belt when, in fact, the product is simply moved passed the location where it would be detected by pivot arm 128. After such product moved passed the pulley 112, it would continue to force section 108a of the belt 108 upwardly causing the pivot arm 148 to pivot downwardly to thereby provide an indication to the controller 144 that there was still a quantity of product present on the belt 32 and the controller could signal the variable speed motors to adjust the speed of movement of the belts appropriately.

As best seen in FIG. 4, the belts 32 and 108 are disposed between the belts 68 and 72 so that sections 32a of belt 32 and 108a of belt 108 extend from near the surface of section 72a of belt 72 to near the surface of section 68a of belt 68. This defines a tubular cavity 164 with moving side, bottom and top walls, for carrying product as earlier described.

At about the location of pulley 36 (FIG. 1), belts 32 and 108 move out from between belts 68 and 72 to extend downwardly and continue to carry the product therebetween toward the tube 12. The upper end of receiving tube 12 terminates near the pulleys 40 and 116, as shown in FIG. 1, to receive product being discharged from between belts 32 and 108. Opposing inside walls 12a and 12b of tube 12 extend to locations between pulleys 40 and 116 respectively, and adjacent thereto, as shown, to better receive product discharged from between belts 32 and 108 To aid in guiding the product into the tube 12, side disks or skirts 40a and 116a are mounted on each side of pulleys 40 and 116 respectively to act as shields or barriers for preventing losing of product laterally from between the belts 32 and 108. These skirts extend downwardly about the upper end of tube 12.

In the manner described, product is deposited via the hopper 8 through an elongate opening 8a (FIG. 2) onto section 32a of the belt 32 and between the spread apart sections 68a and 72a of belts 68 and 72, for carrying it to a discharge tube 12 or other deposit site. As the product moves along with belts 32, 68 and 72, it encounters moving belt 108 which further secures the product on belt 32 and then assists in conveying the product further along about pulley 36 and downwardly to the tube 12. This is accomplished with a simple and easy to maintain configuration of endless belts and allows for the precise feeding of particulate product to a destination.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A particulate product conveying apparatus comprising
a first selectively moveable belt means having a longitudinal dimension and a transverse dimension, and disposed so that its transverse dimension is generally horizontal,
second and third selectively moveable belt means, each having a longitudinal dimension and transverse dimension, and each disposed at generally horizontally spaced-apart locations on either side of the first belt means in a generally facing relationship to extend longitudinally in parallel with the first belt means, with the transverse dimensions of the second and third belt means disposed generally vertically to form moveable side walls extending upwardly from near the sides of the first belt means, to receive particulate product on the first belt mean and between the second and third belt means,
fourth selectively moveable belt means having a longitudinal dimension and a transverse dimension, and disposed at a generally vertically spaced-apart location above at lest a portion of the first belt means, longitudinally in parallel therewith, so that the transverse dimension of the fourth belt means is generally horizontal, and
motive means for selectively causing the first, second, third and fourth belt means to move longitudinally in the same direction at substantiality the same speed to thereby convey particulate product received by the first, second, third and fourth belt means, in the direction of movement of the belt means,
wherein said first and fourth belt means have input ends and discharge ends, wherein the first and fourth belt mean are adapted to move in the direction of the discharge end, and wherein the first and fourth belt means are disposed farther apart at the input ends and closer together at the discharge ends, to enable the first and fourth belt means to more tightly confine the particulate matter as it moves toward the discharge end.

2. Apparatus as in claim 1 wherein the first and fourth belt means are disposed between the second and third belt means, to extend transversely from near the facing wall of the second belt means to the near the facing wall of the third belt means.

3. Apparatus as in claim 1 wherein the first belt means curves from a generally horizontal longitudinal disposition at the input end, downwardly to a generally vertical longitudinal disposition at the discharge end, and wherein the fourth belt means extends from a location spaced-apart from the first belt means at the fourth belt means input end, gradually closer to, then in contact with the first belt means, and then away from the first belt means at the fourth belt means discharge end, to a generally vertical longitudinal disposition.

4. Apparatus as in claim 6 further including hopper means disposed above the first belt means for receiving particulate product from a particulate product source, and depositing particulate product onto the first belt means, between the second and third belt means, and in front of the fourth belt means.

5. Apparatus as in claim 4 wherein said hopper means comprises a chute having an upper enlarged opening for receiving particulate product from a particulate product source, a lower elongate narrow opening for discharging particulate product along a predetermined length of the first belt means, and a hollow body for carrying particulate product from the receiving opening to the discharge opening.

6. Apparatus as in claim 4 further including
means for spreading apart the upper edges of the second and third belt means to enable receiving particulate product from the hopper means onto the first belt means between the second and third belt means at the location of spreading of the second and third belt means.

7. Apparatus as in claim 6 wherein said spreading means comprises first and second rollers disposed between the second and third belt means to contact the second and third belt means respectively and spread them apart.

8. Apparatus as in claim 1 wherein the input end of the fourth belt means is disposed to contact particulate product which is received by the first, second and third belt means and moved toward the fourth belt means, and to pivot upwardly from the first belt means when larger quantities of particulate product are moved into contact with the fourth belt means, and means responsive to the upward pivoting of the first belt means for causing said motive means to slow the movement of the first, second, third and fourth belt means.

9. Apparatus as in claim 8 further including tensioning means for maintaining a predetermined range of vertically directed tension on the fourth belt means to allow certain upward displacement of the fourth belt means, when contacted by larger quantities of particular product being moved by the first, second and third belt means, to thereby accommodate the larger quantities between the first and fourth belt means.

10. Apparatus as in claim 9 further including means for detecting the tension of the fourth belt means, and for causing said motive means to slow the movement of the first, second, third and fourth belt means when the tension increases, beyond said predetermined range and to increase the speed of movement of the first, second, third and fourth belt means when the tension decreases below the predetermined range.

11. Product feeding apparatus for receiving miscible product from a product source and feeding it to a deposit site, comprising a first endless belt disposed with a first section moveable in a generally horizontal direction, and a second section moveable in a generally downward direction, a portion of the first section being positioned under the product source to receive product onto the first section portion for movement to the second section, second and third endless belts disposed with first sections horizontally spaced-apart, above and on either side of the first section of the first belt to move in the same direction and at the same speed as the first section of the first belt to thereby move product to the second section of the first belt, and a fourth endless belt disposed with a first section above a part of the first section of the first belt in front of the product source and moveable in the same direction and at the same speed as the first section of the first belt and the first sections of the second and third belts to contact product received onto the first section portion of the first belt and move it to the second section of the first belt, said fourth endless belt also disposed with a second section generally adjacent to, but spaced apart from, the second section of the first belt, and moveable generally in the same direction and at the same speed as the second section of the first belt, to thereby carry product received between the second section of the first belt and second section of the fourth belt, generally downwardly to the deposit site.

12. Apparatus as in claim 11 further including power means for selectively causing said first, second, third and fourth endless belts to move.

13. Apparatus as in claim 12 further including means for detecting the amount of product received onto the first section portion of the first belt, and to cause the power means to increase the speed of the belts when less product is received and to decrease the speed of the belts when more product is received.

14. Apparatus as in claim 13 wherein said detecting means comprises a pivot arm disposed to pivot about one end thereof, a belt pulley rotatably disposed on the other end of the arm, said fourth belt positioned to move about the pulley at a location above the first belt and in front of the product source so that as more product is received onto the first section portion of the first belt, the fourth belt, as it moves about the pulley, contacts such product causing the pulley to move upwardly away from the first belt thereby causing the pivot arm to pivot upwardly, and vice versa, and means for detecting the angular position of the pivot arm relative to a predetermined reference position.

15. Apparatus as in claim 13 further including take-up pulley means disposed in contact with the fourth belt to maintain a substantially uniform tension in the fourth belt while allowing the first section of the fourth belt to move upwardly away from the first belt when pushed upwardly by more product received onto the first section portion of the first belt, and to move downwardly toward the first belt when less product is received onto the first section.

16. Apparatus as in claim 15 wherein said take-up pulley means comprises a second pivot arm disposed to pivot about one end thereof, a second belt pulley rotatably disposed on the other end of the second arm, said fourth belt positioned to move about the second pulley to cause the pulley to move downwardly toward the first belt as the first section of the fourth belt is moved upwardly, and vice versa, and means coupled to the second pivot arm to urge the second pulley against the fourth belt at a substantially constant force.

17. Apparatus as in claim 15 further including means for detecting the degree of movement of the first section of the fourth belt upwardly and downwardly and to cause the power means to respectively decrease and increase the speed of movement of the belts.

18. Apparatus as in claim 12 wherein the first section of the first belt and the first section of the fourth belt are disposed between the second and third belts.

19. Apparatus as in claim 12 further including a third belt pulley rotatably disposed to contact the first belt between the first and second sections of the first belt to thereby guide the first belt from its generally horizontal first section to its downward second section, wherein the fourth belt is disposed in contact with the first belt at the location where the first belt wraps about the third pulley so that the third pulley guides the fourth belt from its first section to its second section.

20. Apparatus as in claim 19 wherein the first and fourth belts are disposed to spread apart in the downward direction from the third pulley, and in the rearward, horizontal direction from the third pulley, to enable receiving between the first sections of the first and fourth belts product received onto the first section portion of the first belt.

21. Apparatus as in claim 12 further including
a receiving tube having oppositely disposed inside walls which extend upwardly to locations between lower ends of the second sections of the first and fourth belts, to thereby receive product carried downwardly between the second sections of the first and fourth belts.

22. Apparatus as in claim 21 further including
rotatable fourth and fifth belt pulleys about which the lower ends of the second sections of the first and fourth belts respectively are wrapped, and
disks disposed on each side of the fourth and fifth belt pulleys to extend downwardly about the upper end of the receiving tube, to guide product from between the second sections of the first and fourth belts, into the receiving tube.

23. Apparatus as in claim 12 further including
a hopper disposed above the first belt, and having an enlarged upper opening for receiving product, and an elongate narrow lower opening for discharging product along a predetermined length of the first section of the first belt, between the second and third belts, and in front of the first section of the fourth belt.

24. Apparatus as in claim 23 wherein the lower opening of the hopper is disposed between the second and third belts.

25. Apparatus as in claim 24 further including an endless belt disposed above the upper opening of the hopper for receiving product thereon and discharging the product into the hopper through the upper openings.

26. Apparatus as in claim 12 further comprising means for spreading apart the upper edges of the second and third belts for receiving therebetween product from the product source.

27. Apparatus as in claim 26 wherein the spreading means comprises first and second rollers disposed between the second and third belts to contact and spread apart the second and third belts.

28. Apparatus as in claim 27 further including third and fourth rollers disposed forwardly of the first and second rollers on the outsides of the second and third belts respectively to contract and force toward one another the second and third belts.

* * * * *